United States Patent Office 3,565,936
Patented Feb. 23, 1971

3,565,936
N,N-DISUBSTITUTED AMINOALKOXYAL-KYLSILICON COMPOUNDS AND DERIVATIVES THEREOF
Edward Lewis Morehouse, New City, N.Y., assignor to Union Carbide Corporation, a corporation of New York
No Drawing. Continuation-in-part of application Ser. No. 304,965, Aug. 27, 1963. This application June 28, 1968, Ser. No. 741,233
Int. Cl. C07d *103/02;* C07f *7/02*
U.S. Cl. 260—448.2         6 Claims

ABSTRACT OF THE DISCLOSURE

This invention relates to organosilicon compounds and, in particular, to tertiary amino-organosilicon compounds wherein the tertiary amino group contains certain specific groups bonded to nitrogen and is linked to silicon by a divalent hydrocarbon group containing at least one ether linkage. This invention further relates to derivatives of such tertiary amino-organo-silicon compounds and, in particular, to amine oxides, salts and metal coordination compounds derived from such tertiary amino-organosilicon compounds. The compounds have utility as emulsifying agents.

RELATED APPLICATIONS

This application is a continuation-in-part of application Ser. No. 304,965, filed Aug. 27, 1963, now Pat. No. 3,402,191.

This invention provides tertiary amino-organosilanes having the formula:

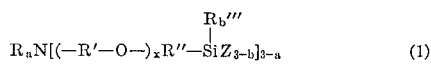

$$R_aN[(-R'-O-)_xR''-SiZ_{3-b}]_{3-a} \quad (1)$$

wherein R is a hydroxy terminated polyalkyleneoxy group, an alkenyloxy terminated polyalkyleneoxy group, a hydroxyalkyl group, a tertiary aminoalkyl group or a divalent group which, together with the nitrogen atom in the formula forms a heterocyclic ring, $a$ has a value of from 0 to 2 inclusive and represents the valence of the group or groups represented by R; $x$ has a value from 1 to 20 inclusive (e.g. from 3 to 20 inclusive); R' is a alkylene group; R'' is an alkylene group containing at least two successive carbon atoms, one of which is attached to the silicon atom of the formula and the other of which is attached to the adjacent ether oxygen atom in the formula; R''' is a monovalent hydrocarbon group free of aliphatic unsaturation; Z is a hydrocarbonoxy group and $b$ has a value of from 0 to 2 inclusive. When $a$ in Formula 1 is 0, no groups represented by R are present; when $a$ in Formula 1 has a value of 1, R is one of the above-identified monovalent groups (i.e., a hydroxy terminated polyalkyleneoxy group, an alkenyloxy terminated polyalkyleneoxy group, a hydroxyalkyl group or a tertiary aminoalkyl group); and when $a$ in Formula 1 has a value of 2, R can represent either two such monovalent groups or a divalent group which, together with a nitrogen atom in the formula, forms a heterocyclic ring.

Typical of the hydroxy terminated polyalkyleneoxy groups represented by R in Formula 1 are the hydroxy terminated polyethyleneoxy, polypropyleneoxy, poly(mixed ethyleneoxy-propyleneoxy) and polybutyleneoxy groups. These latter groups can be represented by formula $HO(C_yH_{2y}O)_{x+1}$ wherein y has a value of at least 2 and x has a value of at least 1. Typical of the alkenyloxy terminated polyalkyleneoxy groups represented by R in Formula 1 are the vinyloxy or allyloxy terminated polyethyleneoxy, polypropyleneoxy, poly(mixed ethyleneoxy-propyleneoxy) and polybutyleneoxy groups. These latter groups can be represented by the formulae:

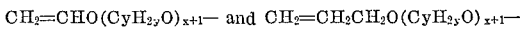

$CH_2=CHO(C_yH_{2y}O)_{x+1}$— and $CH_2=CHCH_2O(C_yH_{2y}O)_{x+1}$— wherein y and x are as above defined. Typical of the hydroxyalkyl groups represented by R in Formula 1 are the beta hydroxyethyl, gamma-hydroxypropyl, delta-hydroxybutyl, and epsilon-hydroxypentyl groups. Typical of the tertiary amino-alkyl groups represented by R in Formula 1 are the beta N,N-dimethylaminoethyl, gamma-N,N-diphenyl aminopropyl, delta-N,N-dibenzyl aminobutyl and epsilon-N,N-dihexyl aminopentyl groups. Typical of the heterocyclic rings formed by R and N in Formula 1 [when $a$ is 2 and R is a divalent group] are the heterocyclic rings present in piperazine, morpholine, pyrrole, imidazole (glyoxalin), indole, pyralole, tiazole, triazole, tetrazole and carbazole. Preferably such rings are composed of only carbon and nitrogen, with hydrogen as the only substituent on the ring or of only carbon, nitrogen and oxygen with hydrogen as the only substituent on the ring. Typical of the alkylene groups represented by R' and R'' in Formula 1 are the 1,2-ethylene; 1,3-propylene; 1,2-propylene; 1,4-n-butylene; isobutylene; and 1,5-pentylene groups. Typical of the monovalent hydrocarbon groups free of aliphatic unsaturation represented by R''' in Formula 1 are the linear alkyl groups (for example the methyl, ethyl, propyl, butyl and octadecyl groups), the cyclicalkyl groups (for example the cyclohexyl and cyclopentyl groups), the aryl groups (for example the phenyl and naphthyl groups), the alkaryl groups (for example the tolyl group) and the aralkyl group (for example the benzyl and beta-phenylethyl groups). Typical of the hydrocarbonoxy groups represented by Z in Formula 1 are the alkoxy groups (e.g. the methoxyl, ethoxy, propoxy, and butoxy groups), and the aryloxy groups (e.g. the phenoxy and the tolyloxy groups).

This invention additionally provides amine oxides of the silanes represented by Formula 1. Such amine oxides are represented by the formula:

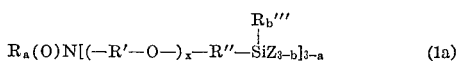

$$R_a(O)N[(-R'-O-)_x-R''-SiZ_{3-b}]_{3-a} \quad (1a)$$

wherein R, R', R'', R'''', Z, $x$, $a$ and $b$ have the above-defined meanings.

This invention also provides salts of the silanes represented by Formula 1. Such salts are represented by the formula:

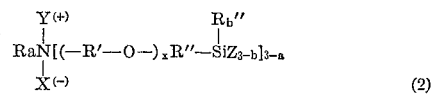

$$\begin{array}{c} Y^{(+)} \quad\quad R_b'' \\ | \quad\quad\quad | \\ RaN[(-R'-O-)_xR''-SiZ_{3-b}]_{3-a} \\ | \\ X^{(-)} \end{array} \quad (2)$$

wherein R, R', R'', R''', Z, $x$, $a$ and $b$ have the above-defined meanings; X is a halogen atom, an acyloxy group, or a monovalent group represented by the formula —YSO$_4$ and Y is a hydrogen atom, a monovalent group represented by the formula —$C_zH_{2z}$COOR''' where $z$ has a value from 1 to 20 and R''' has the above-defined meanings of a monovalent hydrocarbon group containing from 0 to 1 halogen atoms, cyano groups, hydroxy groups, epoxy oxygen atoms and carbalkoxy groups as substituents. When X in Formula 2 is a YSO$_4$ group, Y is free of said substituent groups.

Typical of the halogen atoms represented by X in Formula 2 are the chlorine, bromine and iodine atoms. Typical of the groups represented by Y in Formula 2 are the groups defined above for R and the halogen, cyano, hydroxy, epoxy and carbalkoxy substituted derivatives thereof. Typical of those groups represented by X in Formula 2 which in turn have the formula —YSO$_4$ are the —CH$_3$SO$_4$ and —C$_2$H$_5$SO$_4$ groups. Typical of those groups represented by Y in Formula 2 which in turn are represented by the formula —$C_zH_{2z}COOR'''$ are the cations formed by removal of the halogen atoms from haloalkanoic acid esters (e.g., —$CH_2COOCH_3$ and

—$CH_2COOC_2H_3$)

Typical of the acyloxy groups represented by X in Formula 2 are the anions produced by the hydrolysis of alkanoic acids (e.g. $CH_3COO$— and $CH_3CH_2COO$—) or aryl carboxylic acids (e.g. $C_6H_3COO$— $CH_3C_6H_4COO$—).

In addition, this invention provides tertiary aminoorganosiloxanes consisting of groups rpersented by the formula:

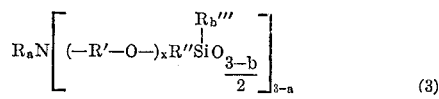 (3)

wherein R, R', R'', R''', x, a and b have the above-defined meanings.

Moreover, this invention provides amine oxides derived from the tertiary amino siloxanes consisting of groups represented by Formula 3. These amine oxides consist of groups represented b ythe formula:

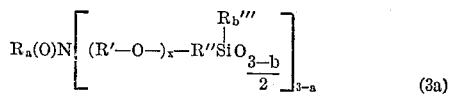 (3a)

wherein R, R', R'', R''', x, a and b have the above-defined meanings.

Further, this invention provides salts of the siloxanes consisting of groups represented by Formula 3. These salts consist of groups represented by the formula:

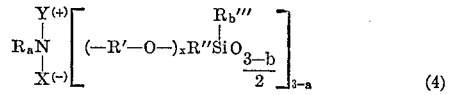 (4)

wherein R, R', R'', R''', x, a, b, X and Y have the above-defined meanings.

Moreover, this invention provides metal coordination compounds of the above-described tertiary amines of this invention. These coordination compounds are more fully described hereinafter.

The tertiary amines of this invention can be produced by the platinum-catalyzed addition reaction of an alkenyl ether of a tertiary hydroxyalkylamine and a hydrosilicon compound (i.e. a silane or siloxane containing silicontaining silicon-bonded hydrogen). This reaction can be illustrated by the skeletal equation:

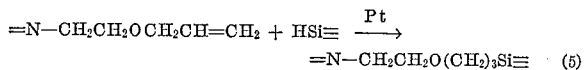 (5)

The platinum employed as a catalyst in this addition reaction can be in the form of a platinum compound (such as chloroplatinic acid) or in the form of elemental platinum supported, if desired, on a material such as charcoal or the gamma allotrope of alumina. The chloroplatinic acid can be used dissolved in tetrahydrofuran, ethanol, butanol, or ethylene glycol dimethyl ether. In general, from 5 to 50 parts by weight of platinum per million parts by weight of the reactants is preferred as the catalyst. The catalyst is preferably present in one reactant and the other reactant is added thereto incrementally. In this addition reaction, temperatures from 100° C. to 160° C. are preferred and solvents for the reactants (e.g. alcohols such as ethanol, aromatic hydrocarbons, such as toluene and ethers such as ethylene glycol dimethyl ether) can be employed, particularly when the reactants are incompatible and/or it is desired to minimize cross-linking. The relative amounts of the reactants employed is not critical and, when an excess of SiH groups are present in a hydrosiloxane reactant, the product will have residual SiH groups which can be used as reactive sites. The addition reactions is preferably conducted under an atmosphere of inert gas to minimize side reactions and the product can be purified by conventional methods (e.g. distillation, sparging and/or filtration) if desired.

In carrying out the addition process to prepare the tertiary amines of this invention of the siloxane variety, it is preferred to add the amine to the hydrosiloxane. Under these conditions the catlyst is in a particularly active state. Furthermore, when the hydrosiloxane is less volatile than the amine, this order of addition permits higher reaction temperatures which can lead to shorter reaction times. Useful products can also be obtained when the reverse order of addition is used. When the olefinic reactants have functional organic groups which may react with silanic hydrogen, and it is desirable to minimize such side reactions, and, in such cases, it is preferable to follow the latter order of addition whereby the silanic hydrogen-containing silicone is added to olefinic amine. An example of such functionality is an alcohol group. In some additions all of both the hydrosiloxane and olefinic alkanolamine may be combined, catalyst added and mixture heated to obtain addition. Because of the exothermic nature of these additions, however, this method of combining the reactants is not recommended.

When a monoalkenyloxyalkylamine is used in the addition process, in order to assure complete reaction of all silanic hydrogen it is preferred that olefin and SiH can be combined in stoichiometric amounts or up to a sixty percent excess of olefin. The excess olefin required is somewhat dependent upon the particular hydrosiloxane used. Presence of SiH in the reaction mixture is detected readily by an external semi-quantitative test using an ethanol-water solution of silver nitrite. Where the silicone has more than one silanic hydrogen per silicone chain and the amine contains two or more olefinic groups, a large excess of one reactant or the other is necessary when it is desired to minimize cross-linking which may produce gels or fluids of undesirably high viscosties.

The hydroslicon compound employed in producing the tertiary amines of this invention by the above-described addition process include hydrosilanes (e.g. methylhydrogendiethoxysilane and phenylhydrogendimethoxysilane) and hydrosiloxanes. The latter siloxanes consist of groups represented by the formula:

 (6)

wherein R''' and b have the above-defined meanings.

It will be recognized by those skilled in the art that the siloxanes of this invention can be produced from hydrosiloxanes that in turn can be produced from hydrolyzable hydrosilanes. Accordingly, the siloxanes of this invention can contain silicon-bonded hydrolyzable groups (e.g., alkoxy groups) and/or silicon-bonded hydroxyl groups due to the incomplete hydrolysis and/or condensation of the silane starting materials.

The alkenyl ethers of tertiary hydroxalkylamines employed in producing the tertiary amines of this invention by the above-described addition process include monoallyl or monovinyl ethers of the following amines: triethanolamine, N,N,N',N' - tetrakis(2 - hydroxypropyl)-ethylenediamine, 3 - dimethylaminopropyl diethanolamine, 1 - hydroxyethyl - 2 - heptadecyl imidazoline, N - hydroxyethyl morpholine, N - hydroxyethyl - N - methyl piperazine; and diallylated triethanolamine; and triallylated triethanolamine and tetraallylated N,N,N'N' - tetrakis(2 - hydroxyethyl)ethylenediamine. Other suitable alkenyl ethers of the alkylene oxide adducts of tertiary hydroxalkyl - amines. Typical of such ethers are $N[(CH_2CH_2O)_{10}CH_2CH=CH_2]_3$
$N[(C_3H_6O)_{15}CH=CH_2]_3$
$N[(CH_2CH_2O)_5(C_3H_6O)_5CH_2CH=CH_2]_3$ These latter alkenyl ethers can be produced by reacting a tertiary hydroxyalkyl amine and an alkylene oxide in the presence of a basic catalyst to produce a tertiary hydroxy-terminated polyalkyleneoxy amine, converting the hydroxy terminating group to an alkali metal oxy group (e.g. —ONa) and reacting the latter group with a haloalkene (e.g. allyl chloride) to produce the alkenyl ether.

The amine oxides of this invention are readily produced by oxidizing the tertiary amines of this invention.

The salts of this invention can be produced by the reaction of the tertiary amines of this invention with hydrocarbyl halides, dihydrocarbyl sulfates, hydrogen halides, monocarbylic acids and the hydrocarbyl esters of haloalkanoic acids. Conventional procedures can be used in producing the salts of this invention.

Particularly active salt forming agents such as benzyl chloride, or various bromides or iodides may be needed particularly in forming quaternary salts. Typical hydrocarbyl halides which may be used in producing the salts of this invention are the following: methyl chloride, ethyl chloride, 2-chloride, 2-chloropropane, 1-chlorobutane, 1 - chloro - 3 - methylbutane, 1 - chloroheptane, 1 - bromoheptane, 3 - (chloromethyl)heptane, 1 - chlorodecane, 1 - chlorododecane, 1 - chlorooctadecane, benzyl chloride, 2 - chloroethylbenzene, chlorocyclohexane, 2 - chloroethanol, chlorhydrin, epichlorhydrin, 3 - chloropropene and 3 - chloro - 2 - methylpropene. The corresponding bromides or iodides may also be used. The hydrocarbyl halide may contain functional groups other than halogen provided they do not also react with the tertiary amino group, e.g. hydroxyl, carboalkoxy or cyano. Hydrocarbyl halides in which the halogen is linked to a carbon of an aromatic ring may be used, but their use is less desirable of the typical sluggishness of the reactions of halogen of this type with tertiary amines. Iodo compounds of this type are the most reactive. In addition to hydrocarbyl halides, various dihydrocarbyl sulfate esters are useful in forming salts, for example, dimethyl or diethyl sulfate.

Other useful salt forming compounds are hydrogen chloride, hydrogen bromide, acetic acid, propionic acid, acrylic acid, benzoic acid, and the methyl ethyl and phenyl esters of chloroacetic acid and chloropropionic acid.

The salt forming reactions do not require a special catalyst. Advantageous, however, are polar solvents that dissolve both the starting reaction mixture and the desired salt. In this respect alcohols, particularly methanol, ethanol and isopropanol are often particularly useful. The concentration of the solvents is not narrowly critical. A preferred concentration of alcohol, e.g. ethanol, however, is about 20 to 50 wt. percent based on the reactants. At this level, of alcohol solvent many of the salts of this invention are soluble. Larger or smaller solvent/reactant ratios may be used however. Other useful polar solvents include dimethylformamide, dimethylacetamide, and various nitriles. Less polar solvents may be used, such as ethylene glycol dimethyl ether, isopropyl ether, toluene, benzene or n-hexane, but these may have the disadvantage that the salt produced precipitates from the solvent, sometimes as gummy solids difficult to process. Also, reactions in relatively non-polar solvents.

Salt formation may be run at pressures equal to or above atmospheric pressures. For small scale preparations it is often convenient to mix the tertiary amine, salt forming compound (e.g. an organohalide or organosulfate) and solvent and maintain at reaction temperatures until salt formation is essentially complete. When a low boiling salt forming compound (such as methyl chloride) is used, a convenient procedure is to heat tertiary amine and solvent to a temperature at which rapid reaction will occur, then add the salt forming compound in gaseous or liquid form to the reaction mixture. The temperatures for relatively rapid salt formations are variable and dependent upon the nature of the particular reactants. The order of reactivity of salt forming compounds with tertiary amines of this invention follows essentially the pattern of salt forming compounds with tertiary organic amines. The salts of this invention are conveniently handled and used directly as solutions in the solvents in which the salts are produced.

The metal-amine coordination compounds of this invention can be produced by the reaction of a tertiary amine of this invention and the transition metal halides, hydroxides, nitrates, carboxylic acid salts, sulfates or phosphates. Typical of such transition metal compounds are ferric chloride, cobalt chloride, cupric chloride as well as the chlorides of zirconium, columbium, titanium and chromium. These coordination compounds are readily prepared by simply mixing the transition metal compound or its hydrate dissolved in a solvent such as ethanol with a tertiary amine of this invention at about room temperature. Preferably sufficient amine is used to provide at least two moles of nitrogen per mole of the transition metal.

The tertiary amines of this invention are useful as corrosion inhibitors for metals, such as iron, which come in contact with aqueous liquids, such as aqueous ethylene glycol.

The salts of this invention are useful as emulsifying agents for water-dimethylsiloxane oil mixtures and for water-paraffin oil mixtures. These salts are also useful for increasing the dispersibility of inorganic fillers and pigments (e.g. finely divided silica) in liquids such as latex paints. Those salts that are waxes are useful as the wax components in polishes for metal surfaces.

The coordination compounds of this invention are useful as emulsifying agents for water-oil mixtures used in cosmetics and as mold release agents.

The tertiary amines, amine oxides, salts and coordination compounds of this invention are useful as sizes for organic textile fibers and glass fibers in order to soften and lubricate the fibers and increase their water repellancy. Those compounds of this invention which are gums are useful in producing elastomers and those compounds of this invention that are resins are useful as protective coatings for metals such as iron.

In the various uses enumerated above for the compounds of this invention, conventional procedures of application (e.g. conventional emulsifying, coating and sizing procedures) can be used to good advantage.

The following examples illustrate the present invention:

As used in the following examples, "Me" denotes the methyl group and "Et" denotes the ethyl group.

EXAMPLE I

To a two-liter flask equipped with thermometer, stirrer, dropping funnel and nitrogen atmosphere is added methyldiethoxysilane (134 g., 1.0 mole) xylene solvent (500 g.) is added and the solution heated to reflux. Chloroplatinic acid (25 parts per million platinum based on total reactants) is added, then a tertiary amine of the average structure $(HOCH_2CH_2)_2NCH_2CH_2OCH_2CH=CH_2$ (208 g., 1.1 mole) containing chloroplatinic acid (25 parts per million platinum based on total reactants) is added dropwise over a period of one hour. The mixture is maintained at reflux for two hours then sparged with nitrogen at 130° C. The product is a liquid having the average structure

$(HOCH_2CH_2)_2NCH_2CH_2OC_3H_6SiMe(OEt)_2$

EXAMPLE II

The tertiary amino-organosilane of Example I (85 g., 0.25 mole) is dissolved in 200 g. of absolute ethanol in a one-liter flask equipped with magnetic stirrer, Dry Ice condenser, thermometer and gas dispersion tube. The solution is heated and maintained between 50° C. and 80° C. while gaseous methyl chloride (15 g., 0.3 mole) is added through the dispersion tube over a period of about two hours. The reaction product is sparged briefly with nitrogen to remove traces of methyl chloride. An ethanolic solution of a quaternary organosilane is obtained. This silane has the structure

EXAMPLE III

The tertiary amino-organosilane of Example I (85 g., 0.25 mole) is dissolved in 150 milliliters of absolute ethanol and the solution heated to 60–65° C. and maintained within this temperature range while adding 30 percent aqueous hydrogen peroxide (30 g., 0.27 mole) dropwide over a period of one-half hour. The reaction mixture is stirred two hours longer. The product is an amide oxide derivative of the tertiary amino-organosilane.

EXAMPLE IV

Solutions of $FeCl_3 \cdot 6H_2O$, $CaCl_2 \cdot 6H_2O$ and $CuCl_2 \cdot 2H_2O$ in ethanol are prepared at 0.1–0.5 weight percent concentration of metal salt. To 5 milliliters of each of these solutions in a test tube is added several drops of the amine-modified silane of Example I. With each metal salt, an ethanol-soluble coordination compound is formed, as indicated by changes in colors and intensities of colors. These complexes remain soluble when the ethanolic solutions are diluted with substantial amounts of water.

EXAMPLE V

The tertiary amino-organosilane of Example I, 85 g., 0.25 mole) is hydrolyzed by addition of 50 milliliters of water. Excess water is removed by vacuum stripping. The product is a homopolymeric amino-organosiloxane having the structure $(HOCH_2CH_2)_2NCH_2CH_2OC_3H_6SiMeO$.

What is claimed is:

1. An organosilicon compound selected from the group consisting of:
   (a) tetiary aminosilanes represented by the formula:

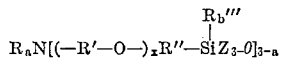

wherein R is a member selected from the group consisting of from 1 to 2 hydroxy-terminated polyalkyleneoxy groups and from 1 to 2 hyldroalkyl groups; $a$ has a value of 1 or 2; R' is an alkylene group; R" is an alkylene group containing at least two successive carbon atoms, one of which carbon atoms is attached to the silicon atom of the formula and the other of which carbon atoms is attached to the adjacent ether oxygen atom in the formula; R" contains no more than 5 carbon atoms; R''' is a monovalent hydrocarbon group free of aliphatic unsaturation; Z is a monovalent hydrocarbonoxy group having no more than 7 carbon atoms; $b$ has a value of from 0 to 2 inclusive; and $x$ has a value from 1 to 20, inclusive; and (b) tertiary aminosiloxanes consisting of groups represented by the formula:

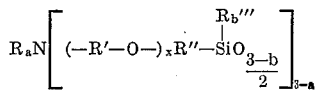

wherein the various symbols have the meanings defined above.

2. Tertiary aminosilanes represented by the formula:

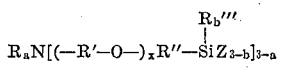

wherein R is a member selected from the group consisting of from 1 to 2 hydroxy-terminated polyalkyleneoxy groups and from 1 to 2 hydroalkyl groups; $a$ has a value of 1 or 2; R' is an alkylene group; R" is an alkylene group containing at least two successive carbon atoms, one of which carbon atoms is attached to the silicon atom of the formula and the other of which carbon atoms is attached to the adjacent ether oxygen atom in the formula; R" contains no more than 5 carbon atoms; R''' is a monovalent hydrocarbon group free of aliphatic unsaturation; Z is a monovalent hydrocarbonoxy group having no more than 7 carbon atoms; $b$ has a value of from 0 to 2 inclusive; and $x$ has a value from 1 to 20 inclusive.

3. Tertiary aminosiloxanes as defined in claim 1 consisting of groups represented by the formula:

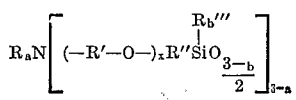

wherein various symbols have the meanings defined in claim 1.

4. An organosilicon compound as defined in claim 1 wherein $x$ has a value from 3 to 20 inclusive.

5. An organosilicon compound as defined in claim 1 wherein $a$ is 1 or 2 and R is a hydroxy-terminated polyoxyalkylene group.

6. An organosilicon compound as defined in claim 1 wherein $a$ is 1 or 2 and R is a hydroxyalkyl group.

References Cited

UNITED STATES PATENTS

| | | | |
|---|---|---|---|
| 3,032,576 | 5/1962 | Morehouse | 260—448.2 |
| 3,032,577 | 5/1962 | Morehouse | 260—448.2 |
| 3,334,121 | 8/1967 | Pepe et al. | 260—448.2 |

TOBIAS E. LEVOW, Primary Examiner

A. P. DEMERS, Assistant Examiner

U.S. Cl. X.R.

252—400, 403; 260—46.5, 268, 270, 429, 429.3, 429.5, 438.1, 438.5, 438

CERTIFICATE OF CORRECTION

Patent No. 3,565,936   Dated February 23, 1971

Inventor(s) E. L. Morehouse

It is certified that error appears in the above-identified patent and that said Letters Patent are hereby corrected as shown below:

Column 7, line 40, that portion of the formula reading "$Z_{3-0}$" should read "$Z_{3-b}$"

Column 7, line 44, "hyldroalkyl" should read "hydroxyalky

Column 8, line 15, "hydroalkyl" should read "hydroxyalkyl

Signed and sealed this 16th day of May 1972.

(SEAL)
Attest:

EDWARD M. FLETCHER, JR.
Attesting Officer

ROBERT GOTTSCHALK
Commissioner of Paten